United States Patent [19]

Shimokawa

[11] Patent Number: 4,798,337

[45] Date of Patent: Jan. 17, 1989

[54] LIQUID FILLING NOZZLE

[75] Inventor: Masao Shimokawa, Tokushima, Japan

[73] Assignee: Shikoku Kakoki Co., Ltd., Tokushima, Japan

[21] Appl. No.: 75,468

[22] Filed: Jul. 20, 1987

[30] Foreign Application Priority Data

Jan. 23, 1987 [JP] Japan .................................. 62-14845

[51] Int. Cl.$^{4}$ .......................... B05B 1/32; F16K 31/12

[52] U.S. Cl. .................................... 239/570; 239/541; 239/583; 137/614.2; 222/496; 141/348; 141/392

[58] Field of Search ............... 239/570, 569, 571, 583, 239/533.1, 541, 451, 456, 459; 251/212; 137/614.2, 471; 222/496, 497, 502, 503, 59; 141/261, 348, 359, 360, 362, 392

[56] References Cited

U.S. PATENT DOCUMENTS 3,537,624 11/1970 Hartman .............................. 222/503

4,537,335 8/1985 Rangwala et al. .................. 222/496

FOREIGN PATENT DOCUMENTS 59-26550 6/1984 Japan .

*Primary Examiner*—Andres Kashnikow

*Assistant Examiner*—Chris Trainor

*Attorney, Agent, or Firm*—Armstrong, Nikaido, Marmelstein & Kubovcik

[57] ABSTRACT

A liquid filling nozzle comprising a vertical tubular nozzle main body having a reduced diameter portion at an intermediate portion of its height, a damper attached to the lower end of the nozzle main body and pivotally movable upward and downward, a resistant member extending within the nozzle main body from the reduced diameter portion to a portion therebelow and movable upward and downward for acting against a liquid flowing downward, a member connecting free ends of the damper to the resistant member, and a resilient member biasing the resistant member upward.

5 Claims, 3 Drawing Sheets

LIQUID FILLING NOZZLE

BACKGROUND OF THE INVENTION

The present invention relates to a liquid filling nozzle for use in filling a liquid, such as flowable food, into containers.

Generally, filling nozzles are usually free of any problem for free-flowing liquids such as milk but encounter difficulty in handling at a high speed liquids, such as fresh cream and yoghurt, which are low in flowability since such a liquid is not dischargeable from the nozzle quickly and can not be cut sharp, whereas the present applicant has already proposed a nozzle by which even a liquid of low flowability can be filled into containers at a high speed free of trouble like free-flowing liquids. As disclosed in Examined Japanese Patent Publication No. SHO 59-26550, the proposed nozzle comprises a tubular nozzle main body, a damper attached to the lower end of the nozzle main body and movable upward and downward, a spring suspending member fixedly provided within the main body at an upper portion thereof, a coiled spring suspended from the suspending member, a member connecting the lower end of the spring to free ends of the damper, and a resistant member secured to the connecting member and positioned below the coiled spring for acting against a downwardly flowing liquid. When a liquid is forced into the filling nozzle, the liquid pressure acting on the damper opens the damper against the force of the coiled spring, while the liquid pressure on the resistant member also acts to open the damper, opening the damper correspondingly to a greater extent. Consequently, the liquid flows out of the nozzle main body quickly without permitting formation of air bubbles due to agitation of the liquid that would occur at a low flow rate. Thus, the nozzle is adapted for a high-speed filling operation.

In recent years, however, there is a growing demand for a more efficient filling operation at a higher speed than is attainable by the above filling nozzle, so that it is desired to develop a filling nozzle which is operable at a higher speed than the proposed device.

SUMMARY OF THE INVENTION

The main object of the present invention is to provide a filling nozzle for filling a liquid into containers at a higher speed than the foregoing nozzle.

The liquid filling nozzle of the present invention comprises a vertical tubular nozzle main body having a reduced diameter portion at an intermediate portion of its height, a damper attached to the lower end of the nozzle main body and pivotally movable upward and downward, a resistant member extending within the nozzle main body from the reduced diameter portion to a portion therebelow and movable upward and downward for acting against a liquid flowing downward, a member connecting free ends of the damper to the resistant member, and a resilient member biasing the resistant member upward.

According to the present invention, the nozzle main body has a reduced diameter portion at an intermediate portion of its height, so that the liquid flows down this portion at a higher speed than when flowing down the portion above or below this portion, while the resistant member is upwardly and downwardly movably retained in the reduced diameter portion. Consequently, the liquid pressure acting on the resistant member is greater than that acting on the resistant member of the conventional nozzle described above, with the result that the damper can be opened to a correspondingly greater degree. This assures a filling operation at a higher speed.

DESCRIPTION OF THE PREFERRED EMBODIMENTS

Embodiments of the invention will be described below with reference to the accompanying drawings.

Figure 1:
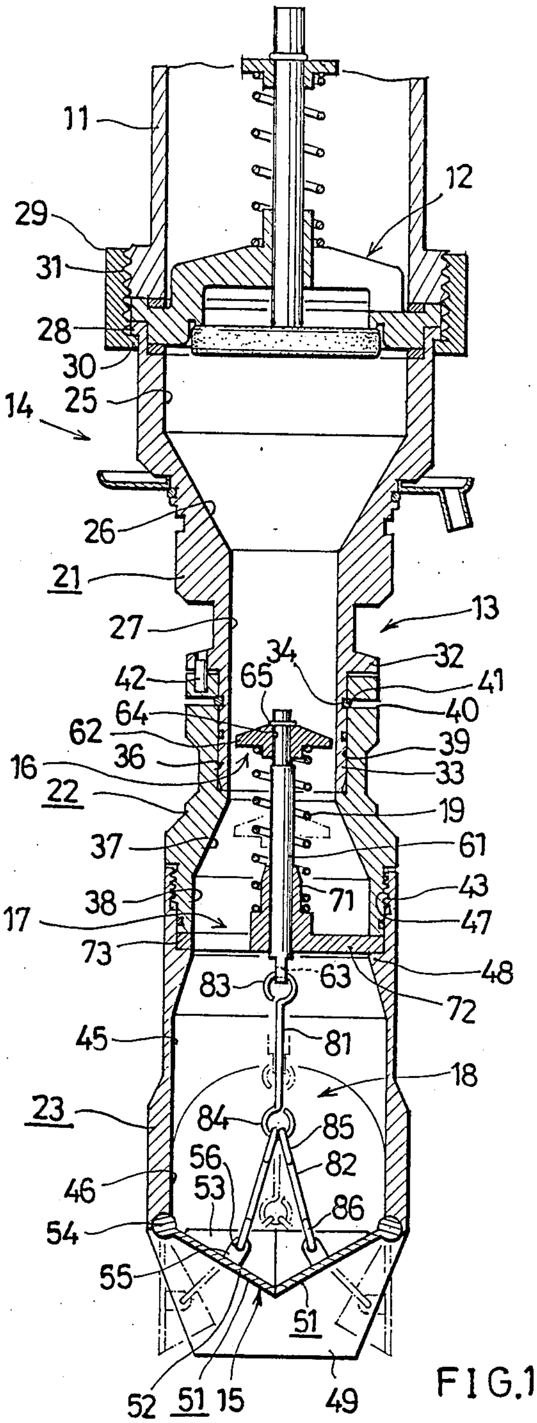
FIG. 1 is a view in vertical section showing an embodiment of the invention.
Figure 2:
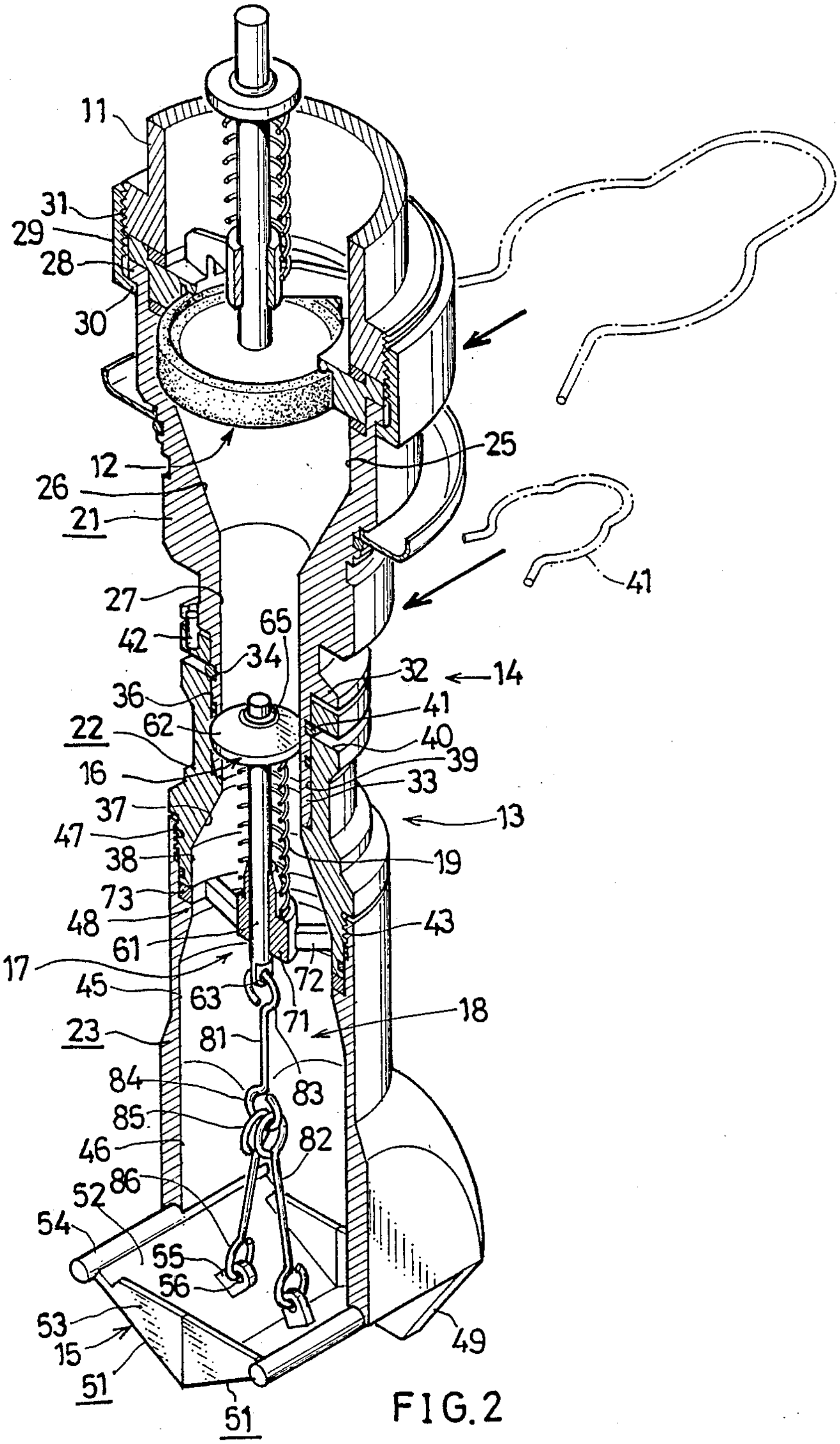
FIG. 2 is a perspective view showing the same with a nozzle main body partly broken away.

FIGS. 1 and 2 show a liquid filling nozzle which is connected to a filling cylinder 11 of a filling machine, with a check valve 12 provided therebetween. The nozzle comprises a vertical tubular nozzle main body 14 having a reduced diameter portion 13 at an intermediate portion of its height, a damper 15 attached to the lower end of the main body 14 and pivotally movable upward and downward, a resistance member 16 extending within the main body 14 from the reduced diameter portion 13 to a portion therebelow and movable upward and downward to act against a downwardly flowing liquid, a guide member 17 for guiding the upward and downward movement of the resistant member 16, a connecting member 18 connecting the free ends of components of the damper 15 to the resistant member 16, and a resilient member 19 biasing the resistant member 16 upward.

The nozzle main body 14 comprises an upper member 21, an intermediate member 22 and a lower member 23. The upper member 21 comprises an upper-end large diameter portion 25, an intermediate portion 26 having an increasing diameter upward, and a lower-end small diameter portion 27. The large diameter portion 25 is equal in inside diameter to the filling cylinder 11 and is provided with a flange 28 around its upper end. The nozzle main body 14 is connected to the filling cylinder 11 with a flanged nut 29 which is screwed on an externally threaded portion 31 at the lower end of the cylinder 11, with the flange 30 of the nut 29 engaged with the flange 28 from below. The lower-end small diameter portion 27 has a flange 32 therearound at an intermediate portion of its height. Under the flange 32, the small diameter portion 27 includes a spigot 33 having a uniform diameter and a smooth-surfaced outer periphery. An annular groove 34 is formed in the outer surface of the spigot 33. The intermediate member 22 comprises an upper-end small diameter portion 36, an intermediate tapered portion 37 having an increasing diameter downward and a lower-end large diameter portion 38. The small diameter portion has a smooth inner surface and provides a socket 39 with the spigot 33 fitted therein. The small diameter portion 36 is formed with slits 40 opposed to the annular groove 34 in the spigot 33. A retaining ring 41 is fitted in the groove 34 through the slits 40, whereby the spigot 33 is prevented from slipping off from the socket 39. A rotation preventing pin 42 is implanted through the flange 32 of the small diameter portion 27 of the upper member 21 in the upper end of the small diameter portion 36 of the intermediate member 22. The lower-end small diameter portion 27 of the upper member 21 and the upper-end small diameter portion 36 of the intermediate member 22 provide the overall reduced diameter portion 13 of the nozzle main body 14. The lower-end large diameter portion 38 is externally threaded as at 43. The lower member 23 comprises a circular upper tubular portion 45 and a quadrilateral lower tubular portion 46. The upper tubular portion 45 is approximately equal in diameter to the lower-end large diameter portion 38 of the intermediate member 23. The upper tubular portion 45 is internally threaded as at 47 and has screwed therein the externally threaded lower end 43 of the intermediate member 22, whereby the lower member 23 is joined to the intermediate member 22. With these members thus joined together, a flange 48 on the inner surface of the circular tubular portion 45 is at a small distance away from the lower end of the intermediate member 22. The lower tubular portion 46 has at its lower end a quadrilateral edge defining an opening. Two inverted trapezoidal guide plates 49 opposed to each other extend downward from two opposed sides of the quadrilateral edge.

The damper 15 comprises a pair of hingedly openable plates 51 provided between the two guide plates 49. Each of the openable plates 51 comprises a quadrilateral bottom wall 52, and a pair of triangular side walls 53 extending upright from the opposite edges of the bottom wall. The bottom wall 52 is secured at one end thereof corresponding to the base portion of the plate 51 to a horizontal pin 54. The horizontal pin 54 is rotatably supported at its opposite ends by the upper edges of the guide plates 49 each at the corresponding end thereof. When the two openable plates 51 are closed, the bottom walls 52 of the plates 51 are V-shaped in cross section. When the plates 51 open or close, the outer surface of each side wall 53 of the plate 51 is in sliding contact with the inner surface of the guide plate 49 opposed thereto. An upward lug 55 is centrally formed on the upper surface of the bottom wall 52 of each openable plate 51. A hole 56 is formed in the lug 55.

The resistant member 16 is in the form of a mushroom and comprises a vertical stem 61 and a horizontal disk-like head 62 secured to the upper end of the stem 61. The lower end of the stem 61 is in the form of a vertical plate formed with a hole 63. The head 62 has a central bore 64 through which the upper end of the stem 61 is inserted. A retaining ring 65 is fitted around the upward projection of the stem 61 above the head. The upper surface of the head 62 is frustoconical.

The guide member 17 comprises a tubular portion 71 having the stem 61 slidably extending therethrough, arms 72 radially extending from the tubular portion 71 in a Y-shaped arrangement when seen from above, and an annular portion 73 interconnecting the outer ends of the arms 72. The annular portion 73 is fixedly fitted in the clearance between the lower end of the intermediate member 22 and the flange 48 inside the lower member 23.

The connecting member 18 comprises an upper rod 81 and two lower rods 82. The upper rod 81 has upper and lower bent ring portions 83, 84 at its upper and lower ends, respectively. Each of the lower rods 82 has upper and lower bent hook portions 85, 86 at its upper and lower ends, respectively. The upper ring portion 83 is passed through the hole 63 in the lower end of the stem 61. The upper hook portions 85 of the two lower rods 82 are engaged with the lower ring portion 84. The lower hook portions 86 of the two lower rods 82 are respectively engaged in the holes 56 in the lugs 55 on the two plates 51.

The resilient member 19 comprises a coiled compression spring which is provided between the tubular portion 71 of the guide member 17 and the head 62 of the resistant member 16 around the stem 61 thereof. The spring has such a force as to hold the damper 15 closed against the gravity acting on the damper 15 and on the liquid within the nozzle main body 14.

Figure 3:
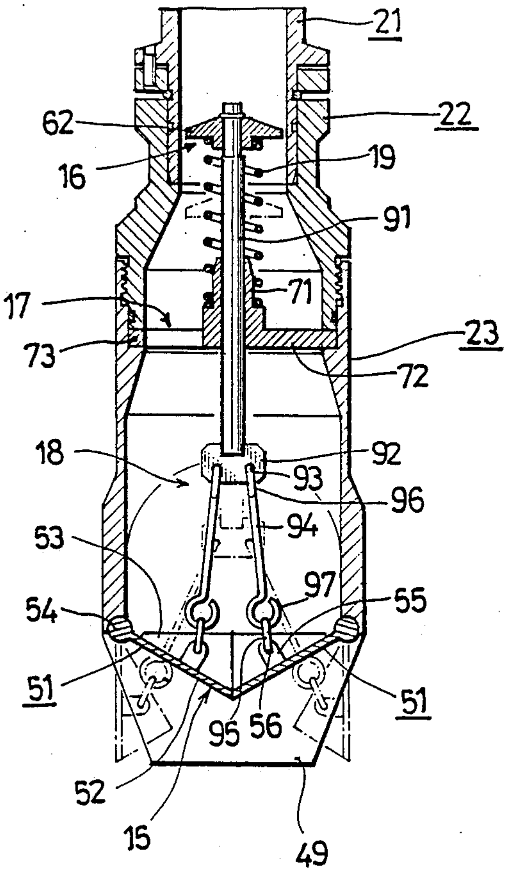
FIG. 3 is a fragmentary view in vertical section showing another embodiment.

FIG. 3 shows another embodiment, in which the stem 91 of the resistant member 16 has a downward lug 92 formed with two holes 93. The connecting member 18 of this embodiment comprises two upper rods 94 and two lower rods 95. Each upper rod 94 has a bent hook portion 96 at its upper end and a bent ring portion 97 at its lower end. The hook portions 96 of the two upper rods 95 are engaged respectively in the two holes 93 in the lug 92 at the lower end of the stem 91. Each of the two lower rods 95 is in the form of an annular ring in its entirety. The rod 95 is passed through the hole 56 of the corresponding openable plate 51 and the ring portion 97 of the corresponding upper rod 94.

What is claimed is:

1. A liquid filling nozzle comprising:

a vertical tubular nozzle main body having a first large diameter portion, an intermediate portion, a reduced diameter portion and a second large diameter portion, said portions being directly connected in the above order, the second large diameter portion having a lower end to discharge liquid therefrom, and the reduced diameter portion being substantially shorter than the total length of the other portions;

a damper pivotally attached at the lower end of the nozzle main body to open and close the lower end;

a resistant member positioned within the reduced diameter portion of the nozzle main body being movable upward and downward for acting against liquid flowing downward;

a member connecting the damper to the resistant member; and a resilient member urging the resistant member upward.

2. A liquid filling nozzle as defined in claim 1 wherein the nozzle main body has at the lower end thereof a quadrilateral opening, a pair of opposed guide plates extending downward from two opposed sides of the quadrilateral opening and wherein, the damper comprises a pair of hinged openable plates provided between the pair of guide plates.

3. A liquid filling nozzle as defined in claim 2 wherein each of the openable plates comprises a quadrilateral bottom wall and a pair of triangular side walls extending upright from opposite side edges of the bottom wall, the two openable plates forming a reversed triangle in cross section when the two openable plates are closed, the outer surface of each side wall of each openable plate being slidably in contact with the inner surface of the guide plate opposed thereto.

4. A liquid filling nozzle as defined in any one of claims 1 to 3 wherein a guide member for guiding the upward and downward movement of the resistant member is provided within the nozzle main body below the reduced diameter portion wherein the guide member comprises a tubular portion in alignment with the nozzle main body, arms extending radially from the tubular portion, and an annular portion secured to the inner surface of the nozzle main body and interconnecting the outer ends of the arms; the resistant member being in the form of a mushroom and comprising a vertical stem slidably fitted in the tubular portion, and a horizontal disc-like head fixed to the upper end of the stem; the connecting member comprising an upper rod and two lower rods, the upper rod having a bent ring portion at each of the upper and lower ends thereof, each of the lower rods having a bent hook portion at each of the upper and lower ends thereof, the upper bent ring portion being passed through a hole formed in the lower end of the stem of the resistant member, the upper bent hooked portions of the two lower rods being in engagement with the lower bent ring portion, of the upper rod each of the lower bent hook portions of the two lower rods being engaged in a hole in an upwardly extending lug provided centrally on the upper surface of the bottom wall of each openable plate; the resilient member being a coiled compression spring provided between the tubular portion of the guide member and the head of the resistant member around the stem thereof.

5. A liquid filling nozzle as defined in any one of claims 1 to 3 wherein a guide member for guiding the upward and downward movement of the resistant member is provided within the nozzle main body below the reduced diameter portion, wherein the guide member comprises a tubular portion in alignment with the nozzle main body, arms extending radially from the tubular portion and an annular portion, secured to the inner surface of the nozzle main body and interconnecting the outer ends of the arms; the resistant member being in the form of a mushroom and comprising a vertical stem slidably fitted in the tubular portion of the guide member, and a horizontal disc-like head fixed to the upper end of the stem; the connecting member comprising two upper rods and two lower rods, each of the upper rods having a bent hook portion at the upper end thereof and a bent ring portion at the lower end thereof, the upper end bent hook portions of the two upper rods being respectively engaged in two holes in a downwardly extending lug provided at the lower end of the stem of the resistant member, each of the two lower rods being in the form of a ring and being passed through a hole in an upwardly extending lug provided centrally on the upper surface of the bottom wall of each openable plate and through the lower end bent ring portion of each upper rod; the resilient member being a coiled compression spring provided between the tubular portion of the guide member and the head of the resistant member around the stem thereof.

* * * * *